US005902669A

United States Patent [19]

Steinhardt et al.

[11] Patent Number: 5,902,669

[45] Date of Patent: May 11, 1999

[54] DISPOSABLE PAPER PRODUCTS WITH INDICATOR MEANS

[75] Inventors: Mark John Steinhardt, Cincinnati; Donn Nathan Boatman, West Chester; Frederick Martin Joffe, Cincinnati; Barbara Ann Ludwig, Cincinnati; Barry Robert Silber, Cincinnati; Paul Dennis Trokhan, Hamilton, all of Ohio

[73] Assignee: The Procter & Gamble Company, Cincinnati, Ohio

[21] Appl. No.: 08/959,085

[22] Filed: Oct. 28, 1997

Related U.S. Application Data

[62] Division of application No. 08/749,708, Nov. 15, 1996, Pat. No. 5,834,099, which is a continuation of application No. 08/427,367, Apr. 24, 1995, abandoned.

[51] Int. Cl.[6] .......... B32B 9/00

[52] U.S. Cl. .......... 428/198; 428/153; 428/154; 428/172; 428/204; 428/321.1; 428/411.1; 428/537.5; 604/2; 604/265; 604/318; 604/344; 604/347; 604/358; 427/265

[58] Field of Search .......... 428/198, 154, 428/172, 204, 411.1, 537.5, 153, 321.1; 604/2, 318, 344, 361, 347, 358, 374, 362, 404, 375; 427/265

[56] References Cited

U.S. PATENT DOCUMENTS

| | | | |
|---|---|---|---|
| 2,228,033 | 1/1941 | Martone | 134/29 |
| 3,301,746 | 1/1967 | Sanford et al. | 162/113 |
| 3,414,459 | 12/1968 | Wells | 161/131 |
| 3,499,316 | 3/1970 | Krause | 73/61.1 |
| 3,775,231 | 11/1973 | Thomas | 171/57 |
| 3,837,996 | 9/1974 | Braun et al. | 161/156 |
| 4,231,370 | 11/1980 | Mroz et al. | 128/287 |
| 4,239,792 | 12/1980 | Ludwa | 428/198 |
| 4,249,827 | 2/1981 | DiMatteo et al. | 356/402 |
| 4,522,863 | 6/1985 | Keck et al. | 428/196 |
| 4,637,859 | 1/1987 | Trokhan | 162/109 |
| 4,915,993 | 4/1990 | Ten Wolde | 428/40 |
| 4,978,565 | 12/1990 | Pigneul et al. | 428/196 |
| 4,990,284 | 2/1991 | Lauterbach et al. | 252/408.1 |
| 5,143,776 | 9/1992 | Givens | 428/194 |
| 5,209,953 | 5/1993 | Grupe et al. | 427/276 |
| 5,294,475 | 3/1994 | McNeil | 428/154 |
| 5,342,861 | 8/1994 | Raykovitz | 523/111 |
| 5,443,889 | 8/1995 | Ruppel et al. | 428/172 |
| 5,468,236 | 11/1995 | Everhart et al. | 604/361 |

FOREIGN PATENT DOCUMENTS

| | | | |
|---|---|---|---|
| 2 225 745 | 11/1992 | United Kingdom | B32B 3/28 |

*Primary Examiner*—William Krynski
*Assistant Examiner*—Abraham Bahta
*Attorney, Agent, or Firm*—Edward J. Milbrada; Larry L. Huston; E. Kelly Linman

[57] ABSTRACT

Disposable paper products, such as paper toweling, are provided with an indicator means which is disposed on said disposable paper product in a discontinuous or combination discontinuous/continuous pattern. The indicator means gives a visually recognizable signal to a user that desirable properties of the disposable paper product are maintained, even after the disposable paper product has become wetted with a substantially transparent aqueous liquid. The wet gray scale difference for the disposable paper product of the present invention is at least about 64 gray scale units when the disposable paper product is wetted with a substantially transparent aqueous liquid.

8 Claims, 5 Drawing Sheets

DISPOSABLE PAPER PRODUCTS WITH INDICATOR MEANS

This is a division of application Ser. No. 08/749,708, filed on Nov. 15, 1996, which is now U.S. Pat. No. 5,834, 099, which is a continuation of application Ser. No. 08/427, 367 filed Apr. 24, 1995, abandoned.

FIELD OF THE INVENTION

The present invention relates to disposable paper products. In particular, the invention relates to providing such disposable paper products with means indicating that desirable properties of the paper product are maintained when the paper product becomes wetted with a substantially transparent aqueous liquid.

BACKGROUND OF THE INVENTION

Disposable products such as facial tissue, bath tissue, paper towels, and the like are typically made from one or more webs of paper. If the products are to perform their intended tasks, the paper webs from which they are formed must exhibit certain physical characteristics. Among the more important of these characteristics are strength, softness, and absorbency. Strength is the ability of a paper web to retain its physical integrity during use. Softness is the pleasing tactile sensation the user perceives as the user crumples the paper in his or her hand and contacts various portions of his or her anatomy with the paper web. Softness generally increases as stiffness decreases. Absorbency is the characteristic of the paper web which allows it to take up and retain fluids. Typically, the softness and/or absorbency of a paper web is increased at the expense of the strength of the paper web. Accordingly, papermaking methods have been developed in an attempt to provide soft and absorbent disposable paper products having desirable strength characteristics.

U.S. Pat. No. 3,301,746 issued to Sanford et al. discloses a paper web which is thermally pre-dried with a through air-drying system. Portions of the web are then imprinted with a fabric knuckle pattern at the dryer drum to yield paper having two distinct regions of differing fiber density. Through air drying typically improves both the softness and the absorbency of a paper web. Disposable paper products made using such paper as a substrate have enjoyed wide commercial success.

U.S. Pat. No. 4,637,859 issued to Trokhan also describes a paper having two distinct regions. The first, the network region, forms an essentially continuous pattern. The other region comprises a plurality of discrete domes. The network region completely encircles the domes and isolates one dome from another. The network region has a relatively high density while the domes have a relatively low density. Paper made according to U.S. Pat. No. 4,637,859 exhibits good absorbency, softness, tensile strength, burst strength and bulk. Depending on the pattern chosen for the network region the paper also has the ability to stretch in the machine direction, the cross direction, and in intermediate directions even in the absence of creping. Paper of this type has enjoyed wide commercial success as a substrate for paper toweling and as bath tissue.

An alternative approach to improving the properties of disposable paper products has been to incorporate non-cellulosic materials into the structure of the disposable paper product. For example, the use of scrims to add strength to disposable paper products is well known in the art. Also, non-cellulosic fibers have been added to the furnish for the papermaking machine used to produce the substrate for the disposable paper product. However, approaches of this type also carry a cost such as loss of softness or loss of absorbency. Typically, the art has only used such approaches to meet very specific needs, where the benefit gained outweighs the cost paid.

Frequently, disposable paper products, particularly paper towels, comprise a laminate of two or more laminae. Disposable products comprising more than one lamina have the desirable properties of increased bulk, increased absorbency and increased strength per unit area of product compared to products comprising a single lamina.

U.S. Pat. No. 3,414,459 issued to Wells describes a laminated paper product formed by embossing identical raised patterns of protuberances on two paper sheets and adhesively joining the mated distal surfaces of the protuberances to form the laminate. Laminates of this type have enjoyed considerable commercial success, particularly as disposable paper toweling.

U.S. Pat. No. 4,978,565 issued to Pigneul, et al. describes lamninated paper products that are adhesively joined, at least partially, by means of protruding elements. The elements are said to be positioned according to lines or combinations of lines which reproduce spaced motifs. Laminates of this type are said to provide a satisfactory bulky texture without a reduction in mechanical strength which is said to come from embossing to a high density of protuberances.

U.S. Pat. No. 5,294,475 issued to McNeil describes embossed paper laminates of two paper lamina wherein each embossed site of one lamina is adhesively joined to the nonembossed region of the other lamina. Laminates of this type have a high quality quilted cloth-like appearance, a relatively thick caliper and in aesthetically pleasing pattern without sacrificing other desirable qualities such as softness, absorbency and bond strength between the laminae.

While the art has continually worked to improve the properties of disposable paper products without loss of other properties, users of such articles frequently find it difficult to recognize such improvements. For example, when an embossed disposable paper product of the present art is saturated with water all patterned appearance coming from such embossments essentially disappears. This means, even if the embossing pattern were chosen to preserve the physical properties of the unembossed paper to the greatest degree possible, a user of such a product would have no readily discernible signal that the product provided such benefits.

Thus, it is an object of the present invention to provide disposable products, such as paper toweling, with a readily recognizable signal that the article has desirable physical properties, both when the article is dry and, particularly, when the article is wetted with a substantially transparent aqueous liquid. It is a further object of the present invention to provide laminated disposable products such that the difference in visual appearance of the paper webs that comprise the laminae and the visual appearance of an indicator means is sufficiently great, when the laminated disposable paper product is wet, to provide such a readily discernible signal.

SUMMARY OF THE INVENTION

The present invention is a disposable paper product comprising at least one lamina of relatively low basis weight paper. The disposable paper product is further provided with an indicator means that is disposed on the lamina in a pattern. The indicator means provides users of the paper product with a visual signal that desirable properties of the towel are maintained, even when the product is wetted with a substantially transparent aqueous liquid. The visual signal becomes substantially noticeable only when the disposable paper product of the present invention is wetted with a substantially transparent aqueous liquid. The indicator means can be further characterized by wet gray scale difference, as measured using image analysis techniques, between those portions of the outwardly facing surfaces of the paper product that are provided with the indicator means and those portions of the outwardly facing surfaces that are not provided with such indicator means. This difference only becomes substantial when the laminated paper towel of the present invention is wetted with a substantially transparent aqueous liquid.

A preferred embodiment of the present invention is a lamninated paper towel comprising two laminae. In the preferred embodiment, the indicator means comprises an opacifying agent that is added to the laminating adhesive and is disposed on the lamina in a pattern comprising either discrete elements or a pattern combining discrete elements and continuous elements.

Alternative embodiments of the present invention include disposable tissue products comprising a single lamina or laminates comprising more than two laminae that are provided with an indicator means as described herein. The indicator means can comprise any material that provides the requisite visual signal when the disposable tissue product becomes wetted with a substantially transparent aqueous liquid. Nonlimiting alternative examples of an indicator means include printed indicator means, fibers having a refractive index when wet that is different than the refractive index of wet cellulosic fibers, and means for preventing wetting of portions of the disposable paper product.

BRIEF DESCRIPTION OF THE DRAWINGS

While the Specification concludes with claims particularly pointing out and distinctly claiming the present invention, it is believed that the same will be better understood by the following Specification taken in conjunction with the associated drawings in which like components are given the same reference numeral, and:

DETAILED DESCRIPTION OF THEE INVENTION

In a preferred embodiment, the present invention comprises a disposable paper product that is a laminate of at least two laminae of paper. Such products have found use as toweling, toilet tissue, and facial tissue. Preferably this paper is the thin, relatively low basis weight paper known commonly as tissue paper. Most preferably the paper comprises two regions, a continuous network and a plurality of domes as described in the aforementioned U.S. Pat. No. 4,637,859 which is incorporated herein by reference. These laminae are joined using methods known in the art. For example, the laminae can be joined by the processes described in either of the aforementioned U.S. Pat. Nos. 3,414,459 or 5,294,475 both of which are incorporated herein by reference. Preferably the laminae are provided with embossed sites and the embossed sites of one lamina are adhesively joined to the nonembossed regions of another lamina using the method commonly known as nested embossing as described, for example, in U.S. Pat. No. 5,294,475. The laminate of the present invention is further provided with an indicator means disposed on at least one of the lamina in a pattern of discrete elements or in a pattern comprising a combination of discrete and continuous elements. This indicator means provides, when the laminate is wetted with a substantially transparent aqueous liquid, a signal that the laminate has maintained desirable properties even after it has become wet.

It should be noted that a laminated structure is not necessary for the indicator means to provide the signal that the disposable paper product has maintained its desirable properties after it has become wetted with a substantially transparent aqueous liquid. Thus, the present invention is contemplated to include paper structures wherein a single lamina of paper is provided with an indicator means as is described hereinbelow.

Figure 1:
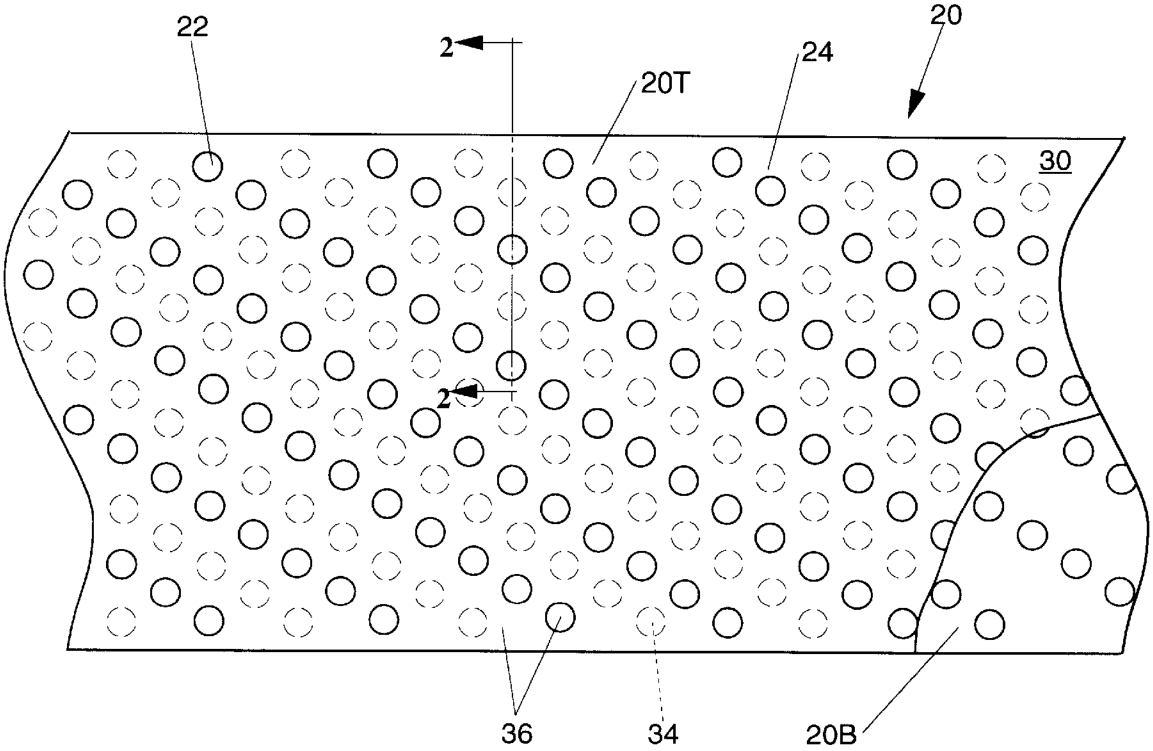
FIG. 1 is a fragmentary top plan view of a preferred embodiment of the present invention, a disposable paper product, shown partially in cutaway to reveal underlying structure.

Referring to FIG. 1, a preferred embodiment of the present invention comprises a laminated paper towel 20. This is not intended to limit the present invention only to paper towel embodiments. Disposable paper products comprising one or more plies of tissue paper such as toilet tissue and facial tissue are also considered to be within the scope of this invention.

The laminated paper towel 20 according to the present invention comprises two laminae 20T and 20B in face to face relation. Each of the laminae 20T and 20B has two distinct zones, a continuous nonembossed region 24, and discrete embossed sites 22 projecting therefrom generally toward the opposed lamina 20B or 20T respectively and preferably orthogonal thereto. A laminating adhesive 27 is applied to the distal ends 23 of at least some of the embossed sites 22 of one of the laminae 20T and/or 20B to adhesively join the facing surfaces of the laminae 20T and 201B.

The laminated paper towel 20 further has two opposed, outwardly facing surfaces 30 and 32. As used herein, the term "outwardly facing surface" means that surface of each lamina 20T or 20B that is opposite the surface of the lamina 20T or 20B that is adhesively joined to the facing lamina 20B or 20T. The outwardly facing surfaces 30 and 32 are those surfaces of the laminated paper towel 20 that are seen by a user.

Each zone 22 and 24 of each lamina 20T or 20B is composed of fibers approximated by linear elements. The cellulosic fibers that are components of the laminated paper towel 20 have one relatively large dimension (along the longitudinal axis of the fiber) compared to the other two relatively very small dimensions (mutually perpendicular, and being both radial and perpendicular to the longitudinal axis of the fiber), so that linearity is approximated. While microscopic examination of the fibers may reveal two other dimensions which are small, compared to the principal dimension of the fibers, such other two small dimensions need not be substantially equivalent nor constant throughout the axial length of the fiber. It is only important that the fiber be able to bend about is axis, be able to bond to other fibers and be distributed by a liquid carrier or by air.

The fibers comprising the laminated paper towel 20 may be synthetic, such as polyolefin or polyester; are preferably cellulosic, such as cotton linters, rayon or bagasse; and more preferably are wood pulp, such as soft woods (gymnosperms or coniferous) or hard woods (angiosperms or deciduous). As used herein, a laminated paper towel 20 is considered "cellulosic" if the laminated paper towel 20 comprises at least about 50 weight percent or at least about 50 volume percent cellulosic fibers, including but not limited to those fibers listed above. A cellulosic mixture of wood pulp fibers comprising softwood fibers having a length of about 2.0 to about 4.5 millimeters and a diameter of about 25 to about 50 micrometers, and hardwood fibers having a length of less than about 1.7 millimeters and a diameter of about 12 to about 25 micrometers has been found to work well for the laminated paper towels 20 described herein.

If wood pulp fibers are selected for the laminated paper towel 20, the fibers may be produced by any pulping process including chemical processes, such as sulfite, sulfate and soda process, and mechanical processes such as stone groundwood. Alternatively, the fibers may be produced by combinations of chemical and mechanical processes or may be recycled. The type, combination, and processing of the fibers used are not critical to the present invention. The hardwood and softwood fibers may be layered throughout the thickness of the laminated paper towel 20 or homogeneously blended therein.

A laminated paper towel 20 according to the present invention is macroscopically two-dimensional and planar, although not necessarily flat. The laminated paper towel 20 does have some thickness in the third dimension. However, the third dimension is relatively small compared to the actual first two dimensions.

The laminated paper towel 20 according to the present invention comprises a laminate of two individual laminae 20T and 20B. A "lamina" is taken off the forming element of a papermaking machine as a single sheet having a thickness prior to drying which does not change unless fibers are added to or removed from the sheet. The basis weight of each lamina 20T and 20B can range from about 9 pounds per 3000 square feet to about 30 pounds per 3000 square feet, preferably about 12 pounds per 3000 square feet to about 20 pounds per 3000 square feet. Each lamina 20T or 20B is joined to the other lamina 20B or 20T. It is to be understood that each lamina 20T or 20B may be directly joined to the opposite lamina 20B or 20T or, in an alternative embodiment of the present invention comprising three or more laminae, may be connected through an intermediate layer or layers, if desired, interposed between the laminae 20T and 20B.

Figure 2:
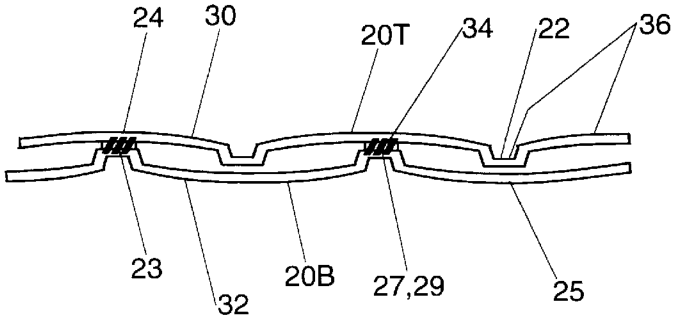
FIG. 2 is an enlarged sectional view of the disposable paper product of the present invention taken along lines 2—2.

As shown most clearly in FIG. 2, each lamina 20T and 20B of the laminated paper towel 20 is joined to the other lamina 20B and 20T at the embossed sites 22. Particularly, the distal end 23 of each embossed site 22 projects towards the nonembossed region 24 of the opposite lamina 20T or 20B. Preferably the laminae 20T and 20B are adhesively joined at the embossed sites 22. Most preferably, as is also shown in FIG. 2, the distal ends 23 of one of one of the laminae, for example lamina 20B, are adhesively joined to the opposite lamina 20T at the nonembossed regions 24 thereof. That is, the laminae 20T and 20B are adhesively joined at alternating embossed sites 22.

As is shown in FIG. 2, laminating adhesive 27 is applied to the distal end 23 of each embossed site 22 of lamina 20B, so that each embossed site 22 of lamina 203 is adhesively joined to the nonembossed region 24 of the opposite lamina 20T. This arrangement provides a laminated paper towel 20 having two laminae 20T and 20B, wherein the lamina 20T and 20B are joined at alternating embossed sites 22. Joining the laminae 20T and 20B at alternating embossed sites 22 provides a good balance of ply bond strength and softness. Alternatively, if additional ply bond strength is desired, the laminae 20T and 20B can be adhesively joined at more embossed sites or, if additional softness is desired, the laminae 20T and 203 can be adhesively joined at fewer embossed sites.

Referring back to FIG. 1, the embossed sites 22 of the first lamina 20T are not registered with the embossed sites 22 of the second lamina 20B. This arrangement provides the advantage that an affirmative step is taken to adhere the embossed sites 22 of one of the lamina 20T or 20B to the nonembossed region 24 of the other lamina 20B or 20T. This arrangement provides the advantage, illustrated in FIG. 2, that the span of the nonembossed region 24 of one lamina 20T or 20B between embossed sites 22 is supported, approximately at its midpoint 25, by an embossed site 22 of the other lamina. Furthermore, the midpoint 25 of such span is stiffened by the laminating adhesive 27 present on the distal end 23 of any embossed site 22 to which such laminating adhesive 27 is applied.

Of course, it will be recognized by one skilled in the art that the embossed sites 22 and nonembossed region 24 may be arranged in a pattern such that the embossed sites 22 do not intercept the midpoint 25 of the span of the nonembossed region 24 of the other lamina 20T or 2B. However, in such an arrangement, the distal end 23 of an embossed site 22 may still have adhesive applied thereto and adhesively join the two laminae 20T and 20B. Furthermore, an embossed site 22 not registered with the midpoint 25 of the span will still support the span of the nonembossed region 24 of the other lamina 20T or 20B.

The embossed sites 22 of each lamina 20T or 20B represent discrete regions of relatively high density, due to the compaction of the fibers which occurs during embossing. As used herein "embossing" refers to the process of deflecting a relatively small portion of each of the laminae 20T and 20B normal to its plane and impacting the projected portion of the laminae against a relatively hard surface to permanently disrupt the fiber to fiber bonds. Embossing results in a permanent localized deformation of the embossed site 22 so deflected. The embossed sites 22 project normal to the plane of the laminar 20T or 20B and towards the opposite lamina 20B or 20T.

The embossed sites 22 of the laminated paper towel 20 are arranged in a nonrandom repeating pattern corresponding to the topography of the apparatus used to create them. Preferably the nonrandom repeating pattern tessellates, so that adjacent embossed sites 22 are cooperatively and advantageously juxtaposed. By being "nonrandom," the embossed sites 22 are considered to be in a predictable disposition and may occur as a result of known and predetermined features of the manufacturing process used to produce the laminated paper towel 20. As used herein, "repeating" means the pattern is formed more than once in the laminated paper towel 20. By being "discrete," the adjacent embossed sites 22 are not contiguous.

As used herein the "essentially continuous" nonembossed region 24 extends substantially throughout the fibrous structure in one or both of its principal directions. The essentially continuous nonembossed region 24 has a lesser density than the embossed sites 22, since the essentially continuous nonembossed region 24 is not compacted in the embossing process. The density of the essentially continuous nonembossed region 24 approximates the density of the discrete embossed sites 22 prior to being embossed.

For the laminated paper towel 20 illustrated in FIGS. 1 and 2, the nonembossed region 24 of the laminated paper towel 20 is preferably essentially continuous in two directions within the plane of the laminated paper towel 20. It is not necessary that such directions be parallel and perpendicular to the edges of the finished product or be parallel and perpendicular to the direction of manufacture of the product. It is only important that tensile strength be imparted to the laminated paper towel 20 in two directions, so that any applied tensile loading may be more readily accommodated without premature failure of the product due to such tensile loading. Preferably, at least one continuous direction is parallel the direction of expected tensile loading of the finished product according to this execution of the present invention.

An example of an essentially continuous nonembossed region 24 is illustrated in FIG. 2. Other examples of paper structures having essentially continuous regions are disclosed in commonly assigned U.S. Pat. No. 4,637,859 issued Jan. 20, 1987, to Trokhan and incorporated herein by reference. Interruptions in the essentially continuous nonembossed region 24 are tolerable, but not preferred, so long as such interruptions do not substantially adversely affect the material properties of that zone of the laminated paper towel 20.

Of course, it is to be recognized if the laminated paper towel 20 is relatively large, as manufactured, and the embossed sites 22 are relatively small compared to the size of the laminated paper towel 20 as manufactured, i.e., varying by several orders of magnitude, absolute predictability of the exact dispersion and patterns among the embossed sites 22 and the continuous nonembossed region 24 may be difficult, or even impossible, to ascertain and yet the pattern still be considered nonrandom.

Conversely, if the laminated paper towel 20 is relatively small and the embossed sites 22 are relatively large, as presented to the consumer, it may appear as though the pattern does not repeat, when in fact a repeating pattern is present in the larger scale laminated paper towel 20 as manufactured. It is only important that the embossed sites 22 and the essentially continuous nonembossed region 24 be dispersed in a pattern substantially as desired to yield the performance properties which render the laminated paper towel 20 suitable for its intended purpose.

It will be apparent to one skilled in the art there may be small transition regions having a density intermediate the density of the embossed sites 22 and the nonembossed region 24 and which circumscribe or border the embossed sites 22. Such transition regions are a normal and expected artifact of the manufacturing process and are not to be confused with either the embossed sites 22 or the nonembossed region 24.

Referring still to FIG. 1, the size of the pattern of the embossed sites 22 within the laminated paper towel 20 may vary from about 2 to about 11 embossed sites 22 per square centimeter (10 to 70 embossed sites 22 per square inch), and preferably from about 5 to about 3 embossed sites 22 per square centimeter (30 to 50 embossed sites 22 per square inch). The embossed sites 22 may be bilaterally staggered in a pattern having a principal axis 45° from the machine direction of manufacture, may be unilaterally staggered or may be registered in position with the adjacent embossed sites 22.

With continuing reference to FIG. 1, the embossed sites 22 of the first lamina 20T are not in register with the embossed sites 22 of the second lamina 20B. This arrangement provides the advantage that an affirmative step is taken to adhere the embossed sites 22 of one lamina 20T or 20B to the nonembossed region 24 of the other lamina 20B or 20T.

Additionally, this arrangement provides the advantage, illustrated in FIG. 2, that the span of the nonembossed region 24 of one lamina 20T or 20B between embossed sites 22 is supported, approximately at its midpoint 25, by the embossed site 22 of the other lamina 20B or 20T. Furthermore, the midpoint 25 of such span is stiffened if the laminating adhesive 27 is present on the distal end 23 of the embossed site 22.

Figure 3:
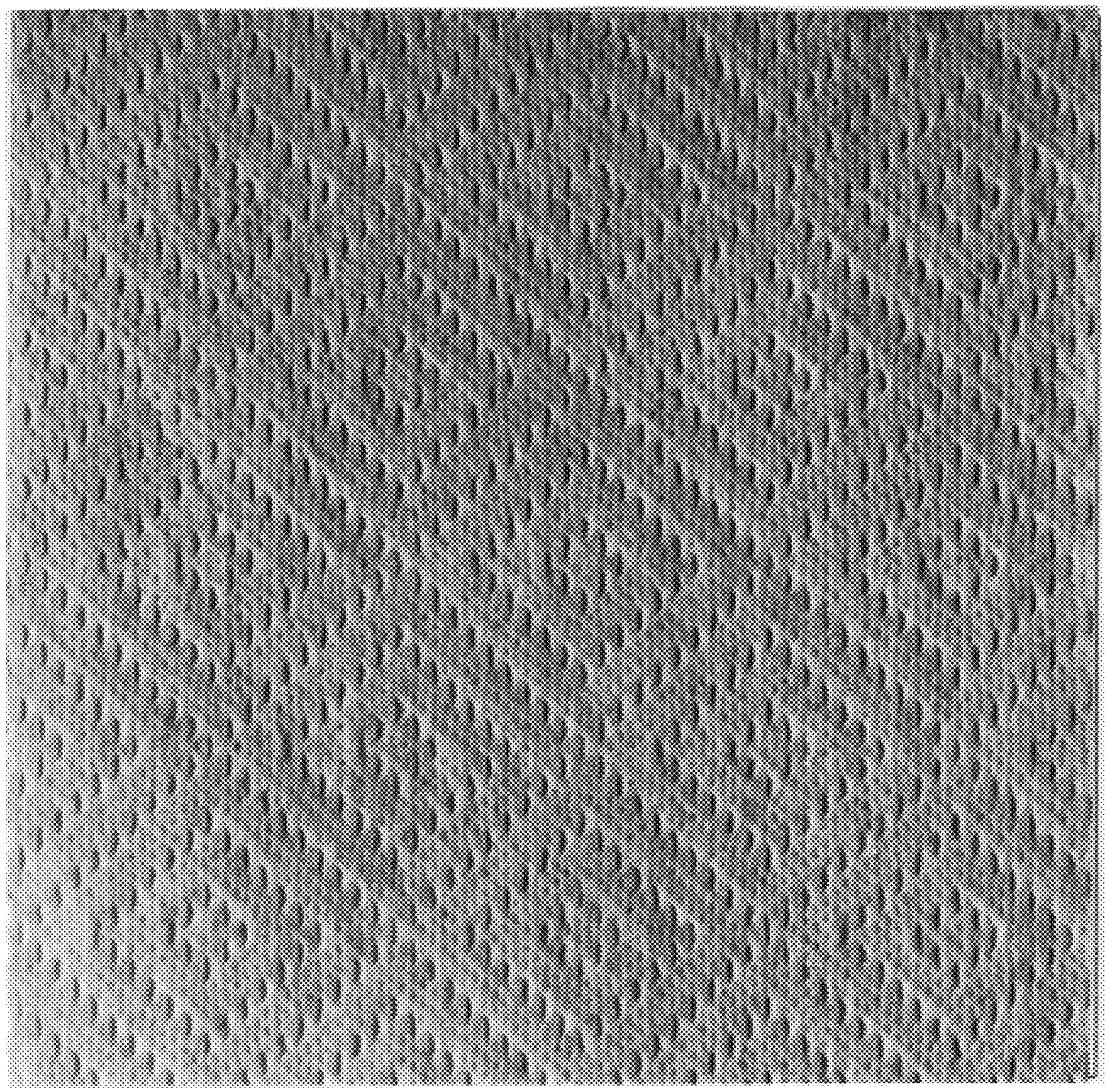
FIG. 3 is a photographic image in plan view of the disposable paper product of the present invention shown in its dry state.

Furthermore, the nonembossed region 24 is not compacted by the manufacturing process, as are the discrete embossed sites 22. This difference in compaction between these zones creates an aesthetically discernible pattern in the laminated paper towel 20. Particularly, the pattern creates the quilted, cloth-like appearance in the laminated paper towel 20 that is shown in FIG. 3. This quilted, cloth-like appearance has been found to be a clear signal to consumers that paper towels having such an appearance also have the desirable combination of strength and softness properties that the papermaking art has worked so diligently to provide.

The laminae 20T and 20B are joined at alternating embossed sites 22 using laminating adhesive 27. In the preferred embodiment of the laminated paper towel 20 shown in FIG. 1, laminating adhesive 27 is applied to the distal ends 23 of the embossed sites 22 of only one of the laminae 20T or 20B. As noted above, if a softer towel 20 is desired, laminating adhesive 27 can be applied to fewer of the distal ends 23. Conversely, if greater ply bond strength is desired, the laminating adhesive 27 can also be applied to the distal ends 23 of the embossed sites 22 of the other of the laminae 20B or 20T. The laminating adhesive 27 is applied by methods well known in the art. Such methods are described in U.S. Pat. No. 3,414,459 and U.S. Pat. No. 5,294,475 both of which are incorporated herein by reference.

The laminating adhesive 27 can comprise any adhesive material known in the art for joining paper laminae. Such materials include, but are not limited to, hot melt adhesives, preferably pressure sensitive hot melt adhesives; latex emulsion adhesives; and water soluble adhesives. Preferably the laminating adhesive 27 comprises a water soluble adhesive. More preferably the laminating adhesive 27 comprises a substantially completely hydrolyzed polyvinyl alcohol resin. A suitable resin is sold under the trade name Evanol 71-30 by the E. I. DuPont DeNemours & Co., Wilmington, Del. Preferably the laminating adhesive 27 is applied from a water solution having from about 2 to about 8 percent resin solids. More preferably the water solution has from about 3 to about 6 percent resin solids.

The laminated paper towel 20 is further provided with an indicator means 29 for providing a user of the towel structure with a visual signal that the towel structure maintains its desirable properties even after the laminated paper towel 20 has become wetted with a substantially transparent aqueous liquid. In the preferred embodiment shown in FIGS. 1 and 2, the indicator means 29 is juxtaposed with or preferably disposed within the laminating adhesive 27. Alternatively, the indicator means 29 can be in a spaced apart relationship with respect to the laminating adhesive 27.

The indicator means 29 provides a visual signal that the laminated paper towel 20 maintains its desirable properties when the towel becomes wetted with a substantially transparent aqueous liquid. The visual signal can also be quantitatively measured, using image analysis techniques, as a difference in gray scale level between those portions 34 of the outwardly facing surfaces 30 or 32 that are provided with the indicator means 29 and those portions 36 of the outwardly facing surfaces 30 and 32 that are not so provided when the laminated paper towel 20 is wetted with a substantially transparent aqueous liquid. The indicator means 29 differs from any decorative elements that may be applied to the laminated paper towel 20 or incorporated into an individual lamina in that the indicator means 29 is not appreciably noticeable to a user when the laminated paper towel 20 is dry. That is, the difference in gray scale level between those portions 34 of the outwardly facing surfaces 30 or 32 that are provided with the indicator means 29 and those portions 36 of the outwardly facing surfaces 30 and 32 that are not is small enough when the laminated paper towel 20 is dry that a user would not be likely to notice the presence of the indicator means 29. As noted above, the indicator means 29 becomes clearly visible only when the paper towel 20 is wetted with a substantially transparent aqueous liquid.

The indicator means 29 can comprise any material that, when applied to the laminae 20T and/or 20B, is not appreciably noticeable when the laminated paper towel 20 is dry yet becomes visually noticeable when the laminated paper towel 20 becomes wetted with a substantially transparent aqueous liquid. Nonlimiting examples of such indicator means include:

1) Opaque white inks which, when applied to the laminae 20T and/or 20B, closely match the color of the fibers that comprise the laminae when the fibers are dry yet, because of their opacity, are visually distinguishable when the fibers become wetted with a substantially transparent aqueous liquid.

2) Fibers having a different refractive index when wet than cellulosic fibers can be incorporated into a portion of the furnish for the papermaking machine used to provide the laminae 20T and 20B. Those portions 34 of the laminae provided with such optically distinct fibers would be visually distinct from those portions 36 having no such fibers when the laminae are wetted with a substantially transparent aqueous liquid.

3) Means for preventing portions 34 of the laminae 20T, 20B from becoming wet. When the remainder of the laminae 20T, 20B become wet, the portions 34 prevented from becoming wet and would be visually distinct.

4) Preferably an opacifying material can be added to the laminating adhesive 27 such that the modified laminating adhesive becomes visually distinct when the laminated paper towel 20 becomes wetted with a substantially transparent aqueous liquid.

In the preferred embodiment of the laminated paper towel 20 shown in FIGS. 1 and 2, an opacifying agent has been added to the laminating adhesive 27 to provide the indicator means 29. The opacifying agent can comprise any material commonly used in the art, such as pigments and the like. However, it must be recognized that, when dry, those portions 34 of the outwardly facing surfaces 30 and 32 that have been provided with an indicator means 29 should not be substantially visually distinguishable from those portions 36 of the outwardly facing surfaces 30 and 32 that have not been provided with an indicator means 29. Preferably an opacifying agent suitable for the present invention has a refractive index of at least about 1.55. A suitable material, if the indicator means 29 is to comprise a modified laminating adhesive 27, is the 75% suspension of titanium dioxide pigment in water known as KRONOS 1050 and sold by KRONOS Canada, Inc. of Varennes, Quebec. Other white, inorganic pigments, such as zinc oxide, calcium carbonate, kaolin, and the like, are also suitable. Alternatively, organic pigmenting means, such as Ropaque HP91 from Rohm & Haas Corp., Philadelphia, Pa., may be used to replace pant or all of the titanium dioxide or other inorganic pigment.

The Applicants have found that the following composition provides both satisfactory ply bond strength in its laminating adhesive role and satisfactory wet gray scale difference from the surrounding fibers in its indicator means role:

| | |
|---|---|
| Titanium Dioxide (KRONOS 1050): | 15parts |
| Hydrolyzed Polyvinyl Alcohol Resin (Evanol 71-30) | 5parts |
| Water | 80parts |
| | 100parts |

The following steps can be used to prepare this modified laminating adhesive 27:

Polyvinyl Alcohol Resin Concentrate

1) Measure approximately 50 parts of room temperature water into a container.
2) Slowly add 8 parts of the hydrolyzed polyvinyl alcohol resin to the water with mixing to insure the resin is evenly dispersed.
3) Add the remaining 42 parts of room temperature water to the resin dispersion.
4) Heat the resin dispersion to a temperature of 185° F. with mixing for at least 45 minutes.
5) Allow the resin solution to cool to room temperature.

Modified Laminating Adhesive Preparation

1) Measure 62.5 parts of the polyvinyl alcohol concentrate into a container.
2) Add, with mixing, 15 parts of the 75% titanium dioxide slurry.
3) Continue mixing and add 22.5 parts of room temperature water, using a portion of the water to rinse the container used for the titanium dioxide slurry.
4) Continue mixing until a homogeneous mixture is obtained.

This modified laminating adhesive 27 can then be used in the production of the laminated paper towel 20 as described below. While the method described above provides a preferred composition for the modified laminating adhesive 27, the Applicants have found that laminating adhesives 27 that comprise between a least about 7 percent titanium dioxide solids, preferably between about 7 percent titanium dioxide solids and about 12 percent titanium dioxide solids, provides an indicator means having a satisfactory wet gray scale difference.

To produce a laminated paper towel 20 of the preferred embodiment of the present invention the nested embossing process described in the above referenced U.S. Pat. No.

5,294,475 may be used. The preferred cellulosic fibrous webs for the substrate 20T and 20B are described in U.S. Pat. No. 4,637,859, the preferred laminating adhesive 27 and indicator means 29 are described above. The resulting laminated paper towel 20 has a pleasing quilted appearance when dry.

Alternatively, the indicator means 29 can be applied to at least one of the lamina 20T or 20B in a separate process step, such as printing the indicator means 29 onto one or more of the laminae. This alternative process has the added advantage of allowing the indicator means 29 to be in a spaced apart relationship with respect to the discrete embossed sites 22.

Figure 4:
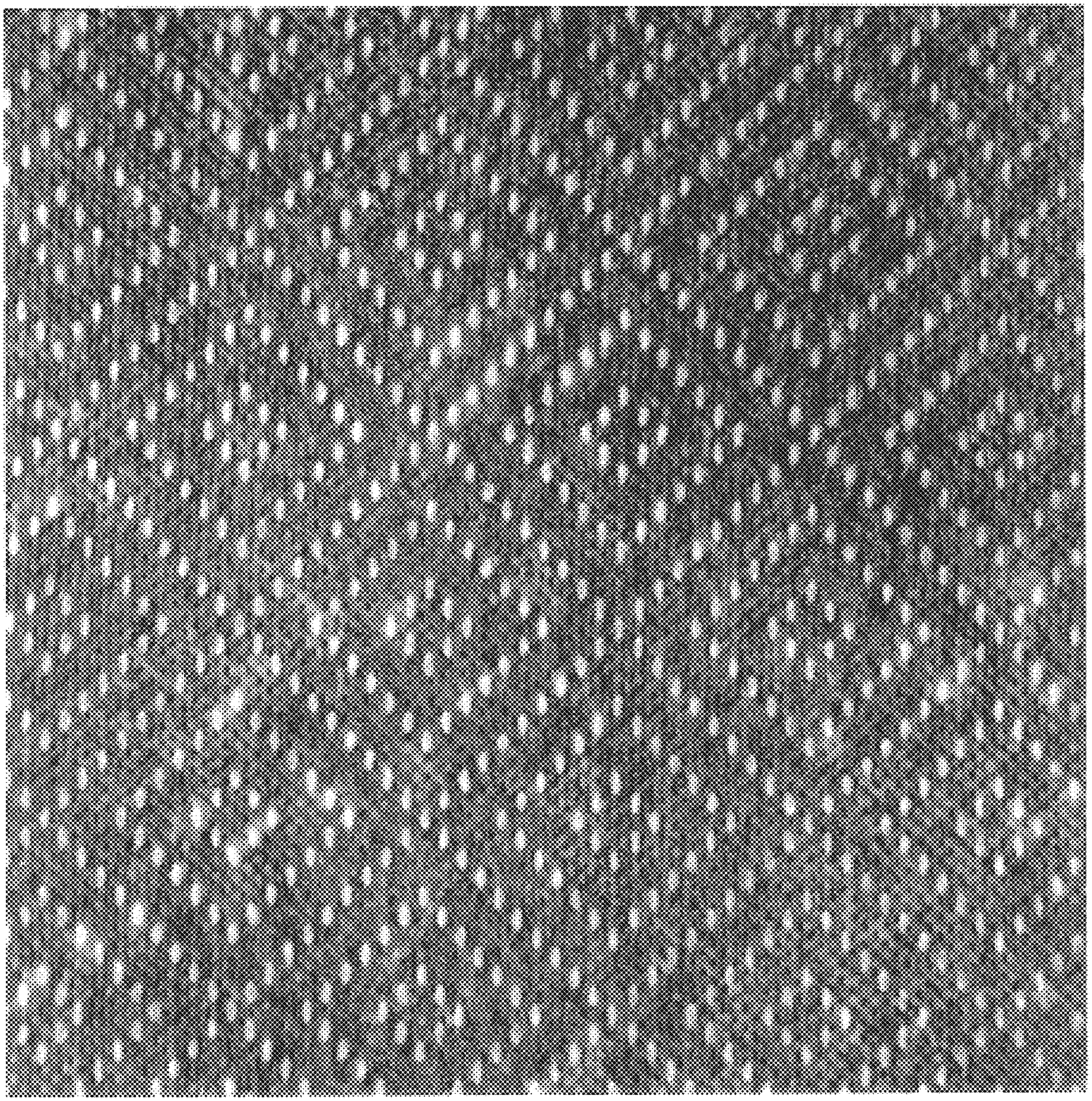
FIG. 4 is a photographic image in plan view of the disposable paper product of FIG. 3 in its wet state.
Figure 5:
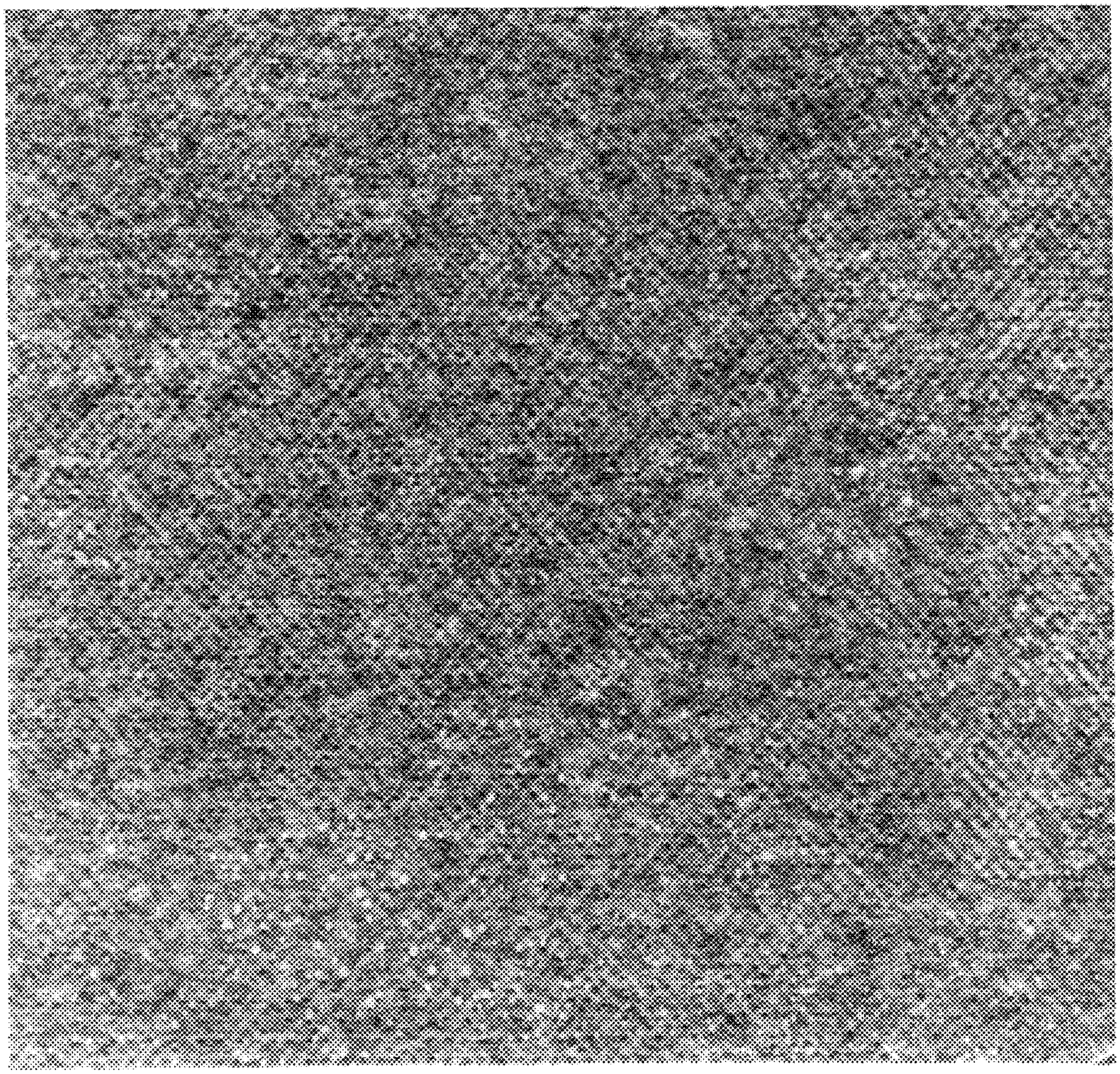
FIG. 5 is a photographic image of a disposable paper product similar to the disposable paper product of the present invention, except that it does not comprise an indicator means, in its wet state.

FIGS. 3 and 4 are photographs which show the preferred embodiment of the present invention the laminated paper towel 20 in both its dry (FIG. 3) and wet (FIG. 4) states. FIG. 3 clearly shows the quilted appearance of the dry laminated paper towel 20. Users have indicated that this appearance connotes both strength and softness. It should also be noted that the indicator means 29 is not appreciably noticeable when the laminated paper towel 20 is in the dry state. When the laminated paper towel 20 is wet, as shown in FIG. 4, the indicator means 29 becomes clearly noticeable. For comparison, FIG. 5 shows, in its wet state, an embossed and laminated paper towel 20 that is similar in appearance to the towel shown in FIG. 3 when it is dry, the towel shown in FIG. 5 having no indicator means 29. The difference in appearance between FIGS. 4 and 5 is evident. Consumers have indicated that this visible signal provides added confidence that the laminated paper towel 20 maintains its desirable strength, softness, and absorbency when wet (See Table 3 hereinbelow).

Gray scale difference can also be used to show how the indicator means 29 becomes evident when the laminated paper towel 20 of the present invention is wetted with a substantially transparent aqueous liquid. As used herein, the term "gray scale difference" means the difference in gray scale level as measured using image analysis techniques, between portions 34 and 36 of a disposable paper product, for example, between the indicator means 29 and the non-embossed regions of the lamina 24 of disposable paper product 20. Gray scale difference may be measured when the product of interest is in either its wet state or in its dry state. A suitable method for measuring gray scale difference is described below.

Table 1 shows wet gray scale difference data for a modified laminating adhesive 27 also comprising various levels of titanium dioxide, a preferred opacifying agent for the indicator means 29.

TABLE 1

| Opacifier Level | Opacifier Solids | Wet Gray Scale Difference* (Gray Scale Units) |
|---|---|---|
| None | 0 | 0 |
| Titanium Dioxide | 3.75% | 34 |
| Titanium Dioxide | 7.5% | 64 |
| Titanium Dioxide | 11.25% | 75 |

*Difference in gray scale level between regions containing indicator means 29 and the nonembossed regions 24 when the laminated paper towel 20 of the present invention has been wetted with a substantially transparent aqueous liquid.

As is clearly shown in Table 1, increasing the amount of opacifier causes a corresponding increase in wet gray scale difference between the indicator means 29 and the laminae 20T or 20B. It is this difference that provides the visual signal to a user that the laminated paper towel 20 maintains its desirable properties even after the it has become wetted with a substantially transparent aqueous liquid. The Applicants have found that a wet gray scale difference of at least 64 gray scale units, preferably at least 67 gray scale units, and more preferably at least 70 gray scale units is necessary before the indicator means 29 serves as a reliable visual signal that desirable properties are maintained by the laminated paper towel 20 of the present invention when it becomes wetted with a substantially transparent aqueous liquid.

However, wet gray scale difference alone is not sufficient to provide a clear visual signal that the fill range of desirable properties is maintained when a disposable paper product is wetted with a substantially transparent aqueous liquid. The Applicants have also found that the indicator means 29 must be applied in a pattern that connotes maintenance of such desirable properties when the disposable paper product becomes wet with a substantially transparent aqueous liquid. The following example will serve to illustrate this point.

As can be seen in Table 2, WALK 'N ROLL™ has a wet gray scale difference that is much larger than the other commercially available laminated paper towels of the current art that were tested. WALK 'N ROLL™ comprises a laminate of two lamina with a scrim therebetween.

TABLE 2

| Current Art Products | Gray Scale Difference (Gray Scale Units) |
|---|---|
| WALK N ROLL ™[1] | 65 |
| SCOTTOWELS ®[2] | −1 |
| BRAWNY ® Towel[3] | −2 |
| BOUNTY ® Towel[4] | −6 |

[1]Kimberly Clark Corp., Dallas, TX
[2]Scott Paper Co., Philadelphia, PA
[3]James River Corp., Norwalk, CT
[4]Procter & Gamble Co, Cincinnati, OH Consumer testing by the Applicants has shown that the visual signal given on wetting with a substantially transparent aqueous liquid in a pattern that comprises solely continuous, interconnected elements does not convey a balanced mix of desirable properties to users. Those skilled in the art will recognize that the pattern of a scrim, such as is used in the WALK 'N ROLL™ product, is comprised of continuous elements, not discrete elements. As used herein the terms "continuous elements" or "continuous, interconnected elements" are intended to describe those elements of a pattern which become evident when a disposable paper product is wetted with a substantially transparent aqueous liquid that extend in an uninterrupted manner. The term "discrete elements" is intended to describe those elements of a pattern which become evident when a disposable paper product is wetted with a substantially transparent aqueous liquid having interruptions therebetween, the individual elements forming a pattern when disposed in combination.

TABLE 3

| Product Code: Indicator Means Pattern | Percent of Panel Indicating Pattern is Most Preferred for Appearance | Statistically Different from Listed Product Code (90% Confidence) |
|---|---|---|
| A: Discrete Elements (Shown in FIG. 4) | 53 | BCDEF |
| B: Continuous Diagonal Mesh* | 18 | DEF |
| C: Interlocking Sinusoidal Dual Weave* | 11 | F |
| D: Interlocking Circles* | 8 | |
| E: Continuous Square Mesh (Similar to scrim)* | 6 | |
| F: No Indicator Means (Shown in FIG. 5) | 4 | |

*Indicator means 29 comprises a pattern of continuous elements

Table 3 shows results of a consumer show test where a group of eighty-five consumers were asked:

1) to view a series of laminated paper towels 20 where each towel in the series had indicator means 29 disposed in one of the patterns described in Table 3, the test towels being wet with water,
2) to rank the test towels in order of preference for appearance, and
3) to rate the test towels, based only on their visual appearance, for a series of properties such as strength, absorbency, softness, etc.

As is clearly shown by Table 3, the pattern of discrete elements is strongly preferred over any of the continuous, interconnected patterns tested. Evaluation of the property ratings for the various patterns indicates that the consumers saw a better balance of the desirable properties was maintained when the indicator means 29 is disposed in a pattern of discontinuous elements. Similar testing has also shown that patterns, visible on wetting with a substantially transparent aqueous liquid, that comprise combinations of discrete elements and continuous elements also conveys maintenance of a desirable balance of strength and softness to consumers.

Gray Scale Difference Test Method

Basic Sample Preparation: Samples were prepared for analysis in the following manner 1) Cut the sample 120 to be tested into 2 inch long by 1 inch wide strips.
2) Use small binder clips (#BC-02, 0.375 inch capacity, Charles Leonard, Inc., Glendale, N.Y. 11385) to attach individual sample strips with the top of the sample surface exposed across a sample holder (0.31 inch diameter aluminum rod bent into a U shape having a radius of curvature of about 0.69 inches).

Figure 6:
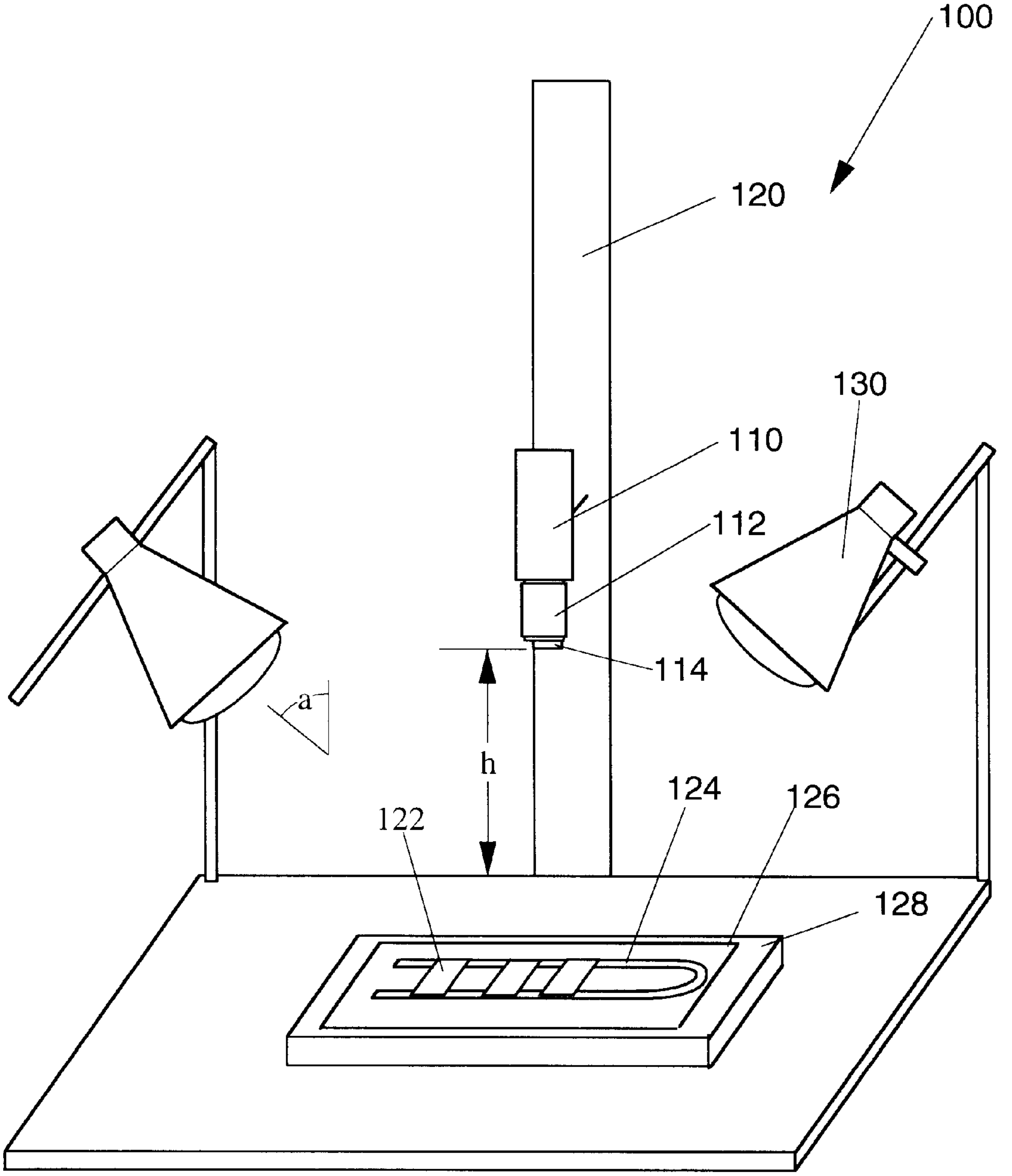
FIG. 6 is a schematic perspective view showing the arrangement of an image analysis apparatus used to evaluate the disposable paper product of the present invention.

Image Analysis Graphic System and Graphic System Setup: The image analysis graphic system 100 shown in FIG. 6 has been found to be suitable for gray scale level difference measurements. The image analysis system 100 should be setup as described herein in order to assure that representative gray scale difference data can be gathered 1) Camera 110: Panasonic Black and White Video Camera (Model WVBD400)
2) Lens 112: Tamron SP 35–80 mm zoom lens
3) Filter 114: 0.9 Neutral Density Wratten gelatin filter (Kodak Cat 149 6397)
3) Lens Setup: The f-stop of the lens should be set at f-11.
4) Image Analysis System Setup: Attach the camera and lens to copy stand 120 Polaroid MP-4). Place the sample strips 122 and sample holder 124 on top of a sample background board 126 (0.125 inch black PVC-Queen City Polymers, West Chester, Ohio). Place the sample background board 126 on top of rectangular platform 128 (25 inches long×8 inches deep×3 inches high). The distance h from the sample surface to the lens face should be about 17 inches if the sample holder and the camera are properly set up. The sample strips and holder are illuminated from the left and right with flood lamps 130 (150 W) that shine on the sample at an angle a of about 50 degrees relative to the vertical.
5) Calibration: The system should be checked hourly using a 14 inch Kodak Gray Scale (Eastman Kodak Co, Rochester, N.Y.) and maintained. Specifically, the mean gray level value from an area in the 1.0 density step wedge of the Kodak Gray Scale should be adjusted to a gray scale value of 41 and not be allowed to vary more than ±2 gray scale values. The mean gray level value from an area in the 0.3 density step wedge of the Kodak Gray Scale should be adjusted to a gray scale value of 153 and not be allowed to vary more than ±2 gray scale values. If necessary, the brightness and contrast of the frame grabber board can be adjusted to reestablish calibration. The background area for measurement of mean gray scale level should be at least 6 $mm^2$.
5) Image Digitization and Capture: A frame grabber board (MVP-AT-Matrox Electronic Systems LTD, Dorval, Quebec H9P 2T4, Canada) installed in a desktop personal computer (Compaq 386/33L with Windows Ver. 3.1) can be used to digitize sample images. Individual sample images should be saved to file on the computer for analysis.
6) Image Analysis Software: Mean gray level values of any desired portion of a sample image can be measured using Optimas Image Analysis Software Version 4.02 (Bioscan, Incorporated, Edmunds Wash. 98020). Final magnification of the image was approximately 6×.

Image Capture and Digitization: The following describes a method suitable for acquiring and analyzing images of samples of disposable paper products in both the wet and the dry state 1) Acquire an image of the sample strip in the dry state using the image analysis apparatus and setup described above.
2) Wet the sample by applying 0.35 ml of distilled water to the middle of the top surface with a 1 ml syringe (Hamilton Co, Reno, N.V., Gastight #1001).
3) Acquire an image of the wetted sample after allowing the sample to equilibrate for 1½ minutes.
4) The gray scale level in selected portions of the sample can then be determined using the image analysis software.

Gray Scale Difference Determination: Gray scale difference is determined as follows 1) Gray scale levels of the unembossed region 24 (or other portion of the sample that wherein the lamina has not been modified) and the gray scale level for multiple embossed sites 22 that have modified laminating adhesive 27 applied thereto (or other site that may comprise the indicator means 29) are determined for each sample as described above and recorded. The gray scale level of five embossed sites on each of four samples should be measured yielding a total of twenty data points for each product of interest.

2) For samples where the embossed sites or other areas of interest are not substantially different in gray scale level from the nonembossed regions to be clearly visible in the digitized image, a preliminary image that accentuates differences in gray scale level can be used to identify areas of interest before actual gray scale level measurements are made. For the preliminary image a piece of 0.125 inch thick black PVC board is held in front of one of the illuminating lights (Lighting from one side accentuates the embossing pattern). Using the Optimas image analysis software, a point (about 0.1 $mm^2$) can be placed on each embossed site of interest and a background area devoid of an embossing pattern can also be outlined. These locations are now identified for subsequent images of the sample strip. To ensure image alignment, a registration mark was placed on the strip that would be visible in the preliminary image, image of the dry strip, and image of the strip once wetted.

3) Calculate the gray scale difference by subtracting the gray scale level of the unembossed region 24 (or other portion of the sample that wherein the lamina has not been modified) from the gray scale level of each embossed site 22 (or other portion of the sample that may comprise the indicator means 29) that was measured. The individual gray scale differences for each data point for the product of interest that are thus calculated are then reported as the average value of the twenty data points.

4) Gray scale difference may be determined for wet or dry samples.

While particular embodiments of the present invention have been illustrated and described, it would be obvious to those skilled in the art that various other changes and modifications can be made without departing from the spirit and scope of the present invention.

What is claimed is:

1. A disposable tissue paper product comprising:

at least one lamina of tissue paper; and an indicator means disposed on a portion of said at least one lamina wherein:

said indicator means comprises an opaque white ink provided in a pattern of discrete elements; and said indicator means is not substantially visually distinguishable when said disposable paper product is dry and said indicator means becomes visually distinguishable when said disposable paper product becomes wet with a substantially transparent aqueous liquid.

2. A disposable paper product according to claim 1 wherein the gray scale difference, when said disposable paper product becomes wet with said aqueous liquid, between said portion of said at least one lamina that is not provided with said indicator means and said portion of said at least one lamina that is provided with said indicator means is at least about 64 gray scale units.

3. A disposable paper product according to claim 1 wherein said indicator means is generally disposed between two of said laminae.

4. A disposable paper product according to claim 1 wherein said pattern further comprises continuous elements.

5. A disposable tissue paper product for use as paper toweling, sanitary tissue and the like, said disposable paper product comprising:

first and second laminae of tissue paper said laminae being provided with embossed regions said embossed regions being provided with embossments having distal ends and with unembossed regions;

a laminating adhesive, applied to at least a portion of said distal ends of said embossments of said first lamina, whereby said distal ends of said first lamina are joined to said unembossed regions of said second lamina; and an indicator means comprising an opaque white ink and disposed on at least one of said laminae in a pattern of discrete elements, wherein said indicator means is not substantially visually distinguishable when said disposable paper product is dry and said indicator means becomes visually distinguishable when said disposable paper product becomes wet with a substantially transparent aqueous liquid.

6. A disposable paper product according to claim 5 wherein the difference in gray scale level, when said disposable paper product becomes wet with said aqueous liquid, between said relatively low basis weight paper and said indicator means is at least about 64 gray scale units.

7. A disposable paper product according to claim 5 wherein at least a portion of said indicator means is disposed in a spaced apart relationship with respect to said laminating adhesive.

8. A disposable paper product according to claim 5 wherein said pattern further comprises continuous elements.

* * * * *

UNITED STATES PATENT AND TRADEMARK OFFICE
CERTIFICATE OF CORRECTION

PATENT NO. : 5,902,669

DATED : May 11, 1999

INVENTOR(S) : Mark John Steinhardt et al.

It is certified that error appears in the above-identified patent and that said Letters Patent is hereby corrected as shown below:

Column 2, line 21, "lamninated" should read -- laminated --.

Column 2, line 33, "in" should read -- an --.

Column 3, line 16, "lamninated" should read -- laminated --.

Column 3, line 64, "THEE" should read -- THE --.

Column 4, line 50, "201B." should read -- 20B. --.

Column 5, line 26, "process," should read -- processes; --.

Column 6, line 3, "203" should read -- 20B --.

Column 6 line 13, "203" should read -- 20B --.

Column 6, line 33, "2B." should read -- 20B. --.

Column 7, line 65, "3" should read -- 8 --.

Column 10, line 14, "pant" should read -- part --.

Column 11, line 37, "level" should read -- level, --.

Column 12, line 15, "fill" should read -- full --.

Signed and Sealed this

Eighteenth Day of January, 2000

*Attest:*

Q. TODD DICKINSON

*Attesting Officer* *Commissioner of Patents and Trademarks*